(12) United States Patent
Tierno

(10) Patent No.: US 6,795,842 B2
(45) Date of Patent: Sep. 21, 2004

(54) METHOD AND APPARATUS FOR COMPARING TWO BINARY NUMBERS WITH A POWER-OF-TWO THRESHOLD

(75) Inventor: José A. Tierno, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/749,081

(22) Filed: Dec. 27, 2000

(65) Prior Publication Data

US 2002/0083108 A1 Jun. 27, 2002

(51) Int. Cl.$^7$ ................................................ G06F 7/02
(52) U.S. Cl. ..................... 708/671; 340/146.2
(58) Field of Search ........................ 708/671; 340/146.2

(56) References Cited

U.S. PATENT DOCUMENTS 6,114,945 A * 9/2000 Houston .................. 340/146.2
6,470,373 B1 * 10/2002 Moller ..................... 708/671

* cited by examiner

*Primary Examiner*—David H. Malzahn
(74) *Attorney, Agent, or Firm*—Thu Ann Dang; Ryan, Mason & Lewis, LLP (57) ABSTRACT

Methods and apparatus for comparing two binary numbers with a power-of-two threshold are provided in accordance with the present invention. In one embodiment, a method for comparing two binary numbers with a power-of-two threshold includes the steps of generating new relations, namely, much_greater_than ($gg_i$) and equal_to ($nq_i$), based at least in part on generate (gt) and propagate (eq) signals created for each bit of the binary numbers to be compared, and applying recursion in order to reduce the set of input signals at successive recursive nodes by a predetermined number. By omitting a pre-addition operation, the present invention eliminates the use of exclusive-OR logic gates, thus significantly reducing system cost and delay.

15 Claims, 8 Drawing Sheets

METHOD AND APPARATUS FOR COMPARING TWO BINARY NUMBERS WITH A POWER-OF-TWO THRESHOLD

FIELD OF THE INVENTION

The present invention relates generally to the field of digital signal processing involving computer arithmetic, and more specifically relates to a system and method for comparing two binary numbers with a power-of-two threshold.

BACKGROUND OF THE INVENTION

Binary comparators for comparing two or more binary numbers are well known in the art, as are methods for increasing the speed and efficiency of the comparison process. However, a more difficult problem is that of comparing two numbers with a threshold, namely, the result of the relation $y<x+k$, where x and y are two numbers to be compared and k is a threshold. A typical solution to this problem is to compute the sign of $-y+x+k$. One conventional approach to performing this sign computation has been to use a layer of full-adders in order to generate sum and carry_out signals (s and c, respectively) such that $s+c=-y+x+k$, followed by a fast carry generation scheme, such as carry-lookahead or carry-select, to generate the output carry of the addition s+c. This output carry is the result of the comparison. An implementation of this conventional scheme is illustrated in FIGS. 1A through 1D.

Figure 1A:
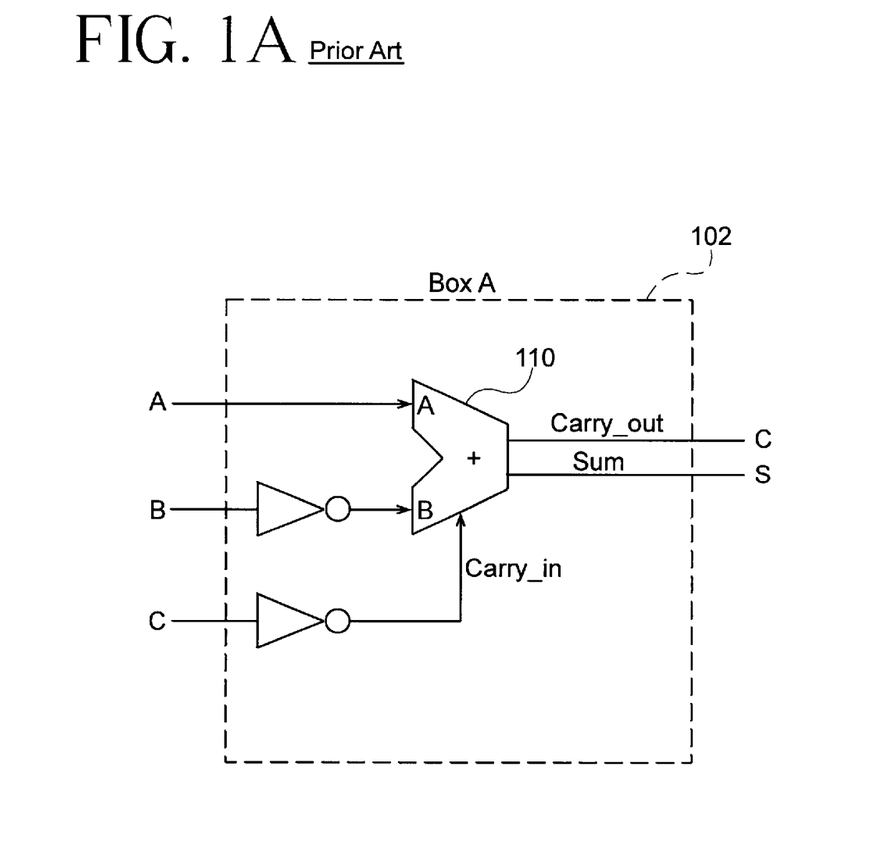
FIGS. 1A–1D are an electrical schematic diagram illustrating a conventional threshold-compare circuit for an exemplary case comparing two eight-bit input number with a threshold of 16.
Figure 1B:
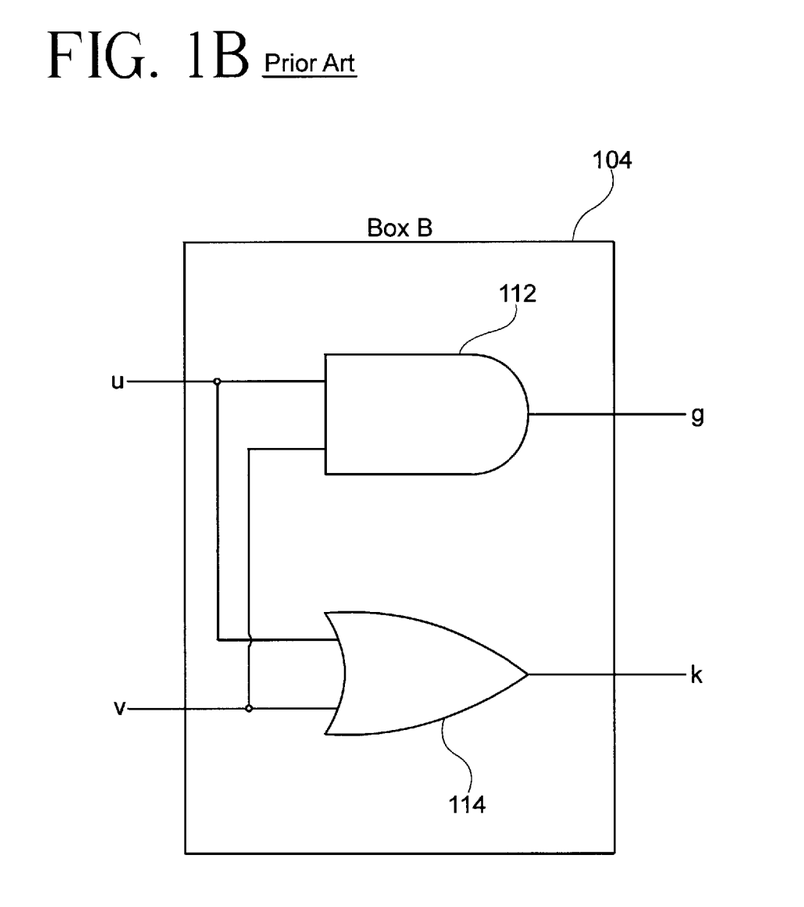
Figure 1C:
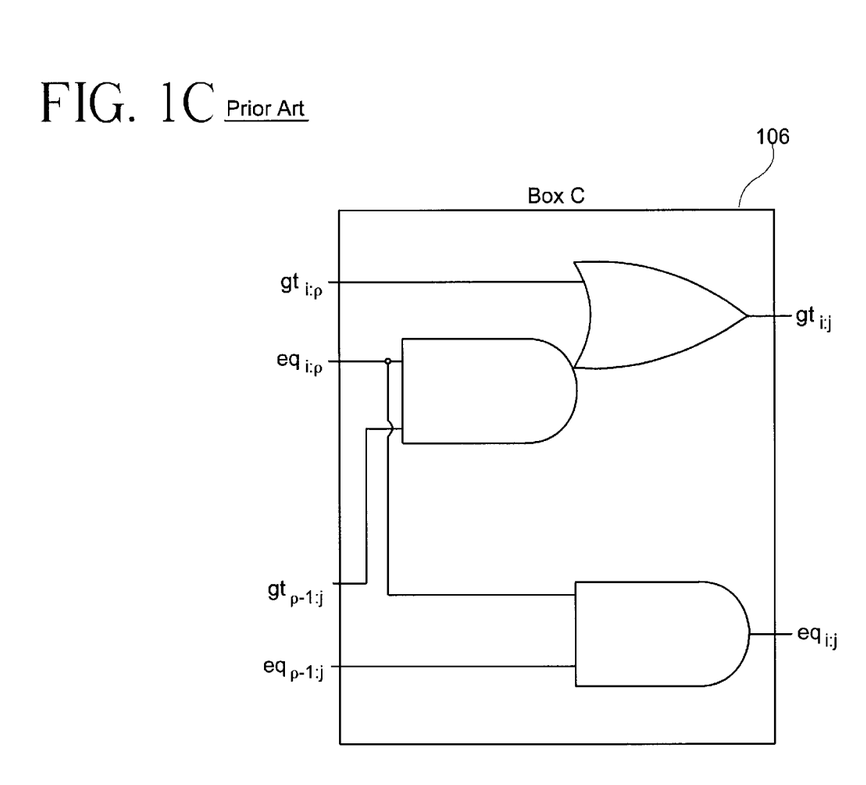
Figure 1D:
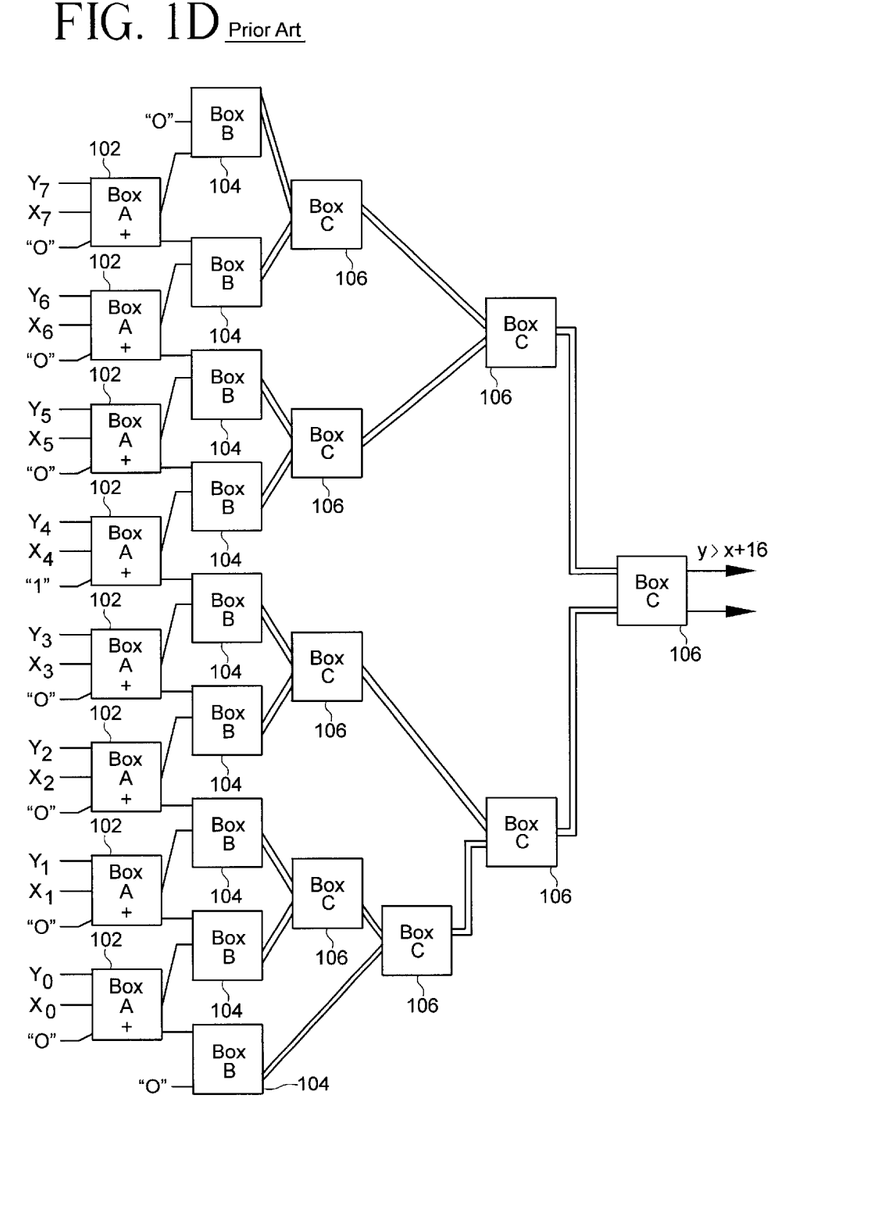

With reference to the overall conventional system block diagram shown in FIG. 1D, two n-bit binary numbers, x and y (in this case, n=8), are first pre-added with a power-of-two threshold, in this case a threshold of 16, by a conventional adder stage 102 (designated as "BOX A"). The details of the adder stage 102 are illustrated in FIG. 1A, wherein corresponding bits of the two input numbers x and y are connected to inputs "A" and "B" of a full adder circuit 110 and the threshold bit is connected to the carry_in input of the full adder 110. The full adder circuit 110 generally includes at least one exclusive-OR gate, along with other logic gates, to generate sum and carry out outputs, s and c, respectively. The use of exclusive-OR gates adds significant cost and delay to the overall circuit and is thus not desirable. The sum and carry_out signals generated for each of the corresponding bits of the input numbers x and y are subsequently fed to n+1 kill-propagate (or generate-propagate) stages 104 (designated as "BOX B"). Each kill-propagate stage 104 receives as inputs a sum signal associated with a particular bit, b, and a carry_out signal associated with a preceding bit, b−1, of the input numbers. The details of the kill-propagate stage 104 are shown in FIG. 1B, wherein a generate output, g, is generated as a logical AND 112 of the two input signals and a kill or propagate signal, k, is generated as a logical OR 114 of the two input signals.

With continued reference to the conventional example of FIG. 1D, the generate and kill signals from the kill-propagate stages 104 are subsequently fed to a compare tree consisting of recursive kill-propagate stages 106 (designated as "BOX C"), the details of which are shown in FIG. 1C. The number of generate and kill outputs are successively reduced at each level of recursive stages 106, until a single output corresponding to the desired result $y>x+16$ is obtained.

An interesting special case occurs when the threshold in the comparison is a power of two (i.e., $2^k$). This case appears in the add-carry-select structure of a maximum-likelihood detector when the inputs have been properly scaled. The add-carry-select circuit is critically flawed, however, in the sense that it cannot be easily pipelined. Moreover, the extra addition required to initially reduce the three input numbers into two numbers is costly in terms of circuit complexity and speed, among other factors, since this topology requires three-input exclusive-OR (XOR) gates. In fact, approximately one third of the total propagation delay of the circuit can be attributed to the XOR gates employed in the conventional architecture.

There is a need, therefore, in the field of computer arithmetic involving the comparison of two binary numbers with a power-of-two threshold, to provide an architecture and method which avoids the extra level of addition, thereby eliminating the use of exclusive-OR logic gates, and which may be easily pipelined.

SUMMARY OF THE INVENTION

The present invention provides methods and apparatus for comparing two numbers having a power-of-two threshold, $y>x+2^k$, that does not require the two numbers and the threshold to be pre-added. In this manner, the present invention eliminates the need for exclusive-OR (XOR) logic gates which are costly and add significant propagation delay to the overall circuit.

In one illustrative aspect of the invention, an architecture is provided which addresses the issue of comparing two binary numbers with a power-of-two threshold by employing a comparator circuit which provides an output signal corresponding to the relation $y>x+2^k$. By defining new relations, namely, much_greater_than ($gg_i$) and equal_to ($nq_i$), based at least in part on generate (gt) and propagate (eq) signals created for each bit of the binary numbers to be compared, and by applying recursion in order to reduce the set of input signals at subsequent nodes or levels of recursion by a predetermined number, the XOR gates may be eliminated, thereby significantly reducing the overall cost of the circuit and essentially eliminating other disadvantages present in conventional methods and apparatus.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative circuit for comparing two binary numbers with a power-of-two threshold. However, it is to be understood that the present invention is not limited to this or any particular circuit configuration. Rather, the invention is more generally applicable to any suitable circuit or architecture for comparing two binary numbers with a power-of-two threshold in accordance with the mathematical relationships set forth herein.

Assume that x and y are two n-bit numbers, preferably represented as vectors of binary values, namely x[n−1:0] and y[n−1:0], where n is an integer greater than or equal to one. Assume also that k is an integer such that n>k≧0. In order to compute the result of the comparison of the two numbers, x and y, with the power-of-two threshold, $2^k$, as set forth in the relation $y>x+2^k$, the method and apparatus of the present invention preferably divides the problem into a plurality of smaller intervals and expressions that are easier to solve and then recursion is applied. In accordance with the present invention, the above relation $y>x+2^k$ is preferably defined as:

$$y>x+2^k \equiv (y_{n-1:k}>x_{n-1:k}+1) \vee (y_{n-1:k}=x_{n-1:k}+1) \wedge (y_{k-1:0}>x_{k-1:0}) \quad (1)$$

where the symbol "$\vee$" represents a logical OR operation and the symbol "$\wedge$" represents a logical AND operation, as appreciated by those skilled in the art. Equation (1) can be re-written as:

$$y>x+2^k \equiv (y_{n-1:k}>x_{n-1:k}+1) \vee (y_{n-1:k}>x_{n-1:k}) \wedge (y_{k-1:0}>x_{k-1:0}) \quad (2)$$

As shown in the above equations (1) and (2), the problem of solving the relation $y>x+2^k$ is essentially divided into two intervals, namely, the interval [k−1:0] and the interval [n−1:k]. It is to be appreciated, however, that any number of intervals may be defined, provided the intervals are mutually exclusive and include at least two bits.

With reference to equation (2) above, the relation $y>x+2^k$ is preferably determined by solving for two separate quantities, namely, the relations $y_{n-1:k}>x_{n-1:k}+1$ and $(y_{n-1:k}>x_{n-1:k}) \wedge (y_{k-1:0}>x_{k-1:0})$, and then performing a logical OR operation on the two resultant quantities.

In order to simplify the above expressions, the following illustrative definitions may be introduced:

$$eq_{i:j}=(y_{i:j}=x_{i:j}) \quad (3)$$

$$gt_{i:j}=(y_{i:j}>x_{i:j}) \quad (4)$$

$$gg_{i:j}=(y_{i:j}>x_{i:j}+1), \quad (5)$$

where i and j are integers, and i>j≧0. The definition eq refers to an "equal" or propagate signal, gt refers to a "greater than" or generate signal, and gg refers to a "much greater than" signal. Directly substituting the above definitions (3), (4) and (5) into equation (2) then yields:

$$y>x+2^k \equiv gg_{n-1:k} \vee (gt_{n-1:k} \wedge gt_{k-1:0}) \quad (6)$$

A simple recursive relationship between gt and eq can be defined, namely:

$$gt_{i:j}=gt_{i:k} \vee (eq_{i:k} \wedge gt_{k-1:j}) \quad (7)$$

$$gt_i=y_i \wedge \overline{x_i} \quad (8)$$

$$eq_{i:j}=eq_{i:k} \wedge eq_{k-1:j} \quad (9)$$

$$eq_i=y_i \vee \overline{x_i} \quad (10)$$

where the symbol "‾", used in equations (8) and (10) above, designates a logical inversion or NOT operation, as is generally known in the art. Those skilled in the art will appreciate that an exclusive-NOR (XNOR) function, which may be derived by taking the compliment of an exclusive-OR (XOR) function, is also known as the equivalence or equality function since a logic "1" results only when the inputs are equal. Equation (10) is not exactly equality, but a modified version of equality that is preferably implemented using a logical NOR operation rather than an XOR operation. As noted previously, in comparison to NOR logic gates, XOR logic gates generate significantly greater propagation delay and additionally require a larger physical layout. It is therefore desirable to avoid using XOR logic elements in the circuit implementation. The present invention uniquely accomplishes this objective.

As discussed previously herein, with reference to equations (7)–(10) above, it is important to note that although only two intervals of recursion are shown for purposes of simplification, namely, [k−1:j] and [i:k], any number of mutually exclusive intervals may be defined. Moreover, the intervals need not be equivalent in length.

Figure 2:
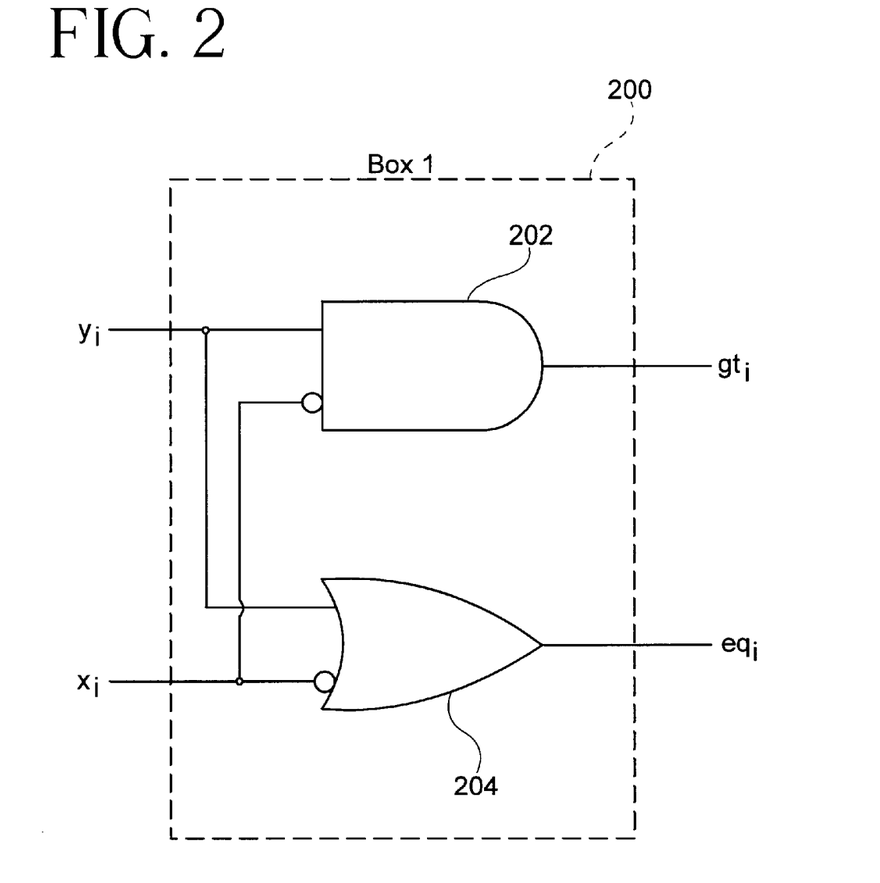
FIG. 2 is an electrical schematic diagram illustrating a preferred circuit for implementing equations (7) and (9), in accordance with the present invention.

By way of example only, FIG. 2 depicts a preferred embodiment of the present invention for implementing equations (8) and (10) above. It is to be appreciated that the circuit implementation (designated herein as "BOX 1") 200 shown in FIG. 2 is merely illustrative, and that other suitable circuit configurations are similarly contemplated for use with the present invention. The circuit 200 preferably generates the propagate and generate base recursion signals $eq_i$ and $gt_i$, respectively. With reference to FIG. 2, a two-input logical AND gate 202, or equivalent circuit or device, is preferably employed to implement equation (8). The signal $x_i$ is preferably negated (i.e., inverted) and operatively connected to a first input of the AND gate 202 and the signal $y_i$ is operatively connected to a second input of the AND gate 202, thereby generating the output signal $gt_i$ which is active high only when $y_i$ is greater than $x_i$, in accordance with equation (8). Likewise, a two-input logical OR gate 204, or equivalent circuit or device, is preferably employed to implement the function set forth in equation (10). Again, the signal $x_i$ is negated and operatively connected to a first input of the OR gate 204 and the signal $y_i$ is operatively connected to a second input of the OR gate 204, thereby generating the output $eq_i$ which is active high when $y_i$ and $x_i$ are equal.

Figure 3:
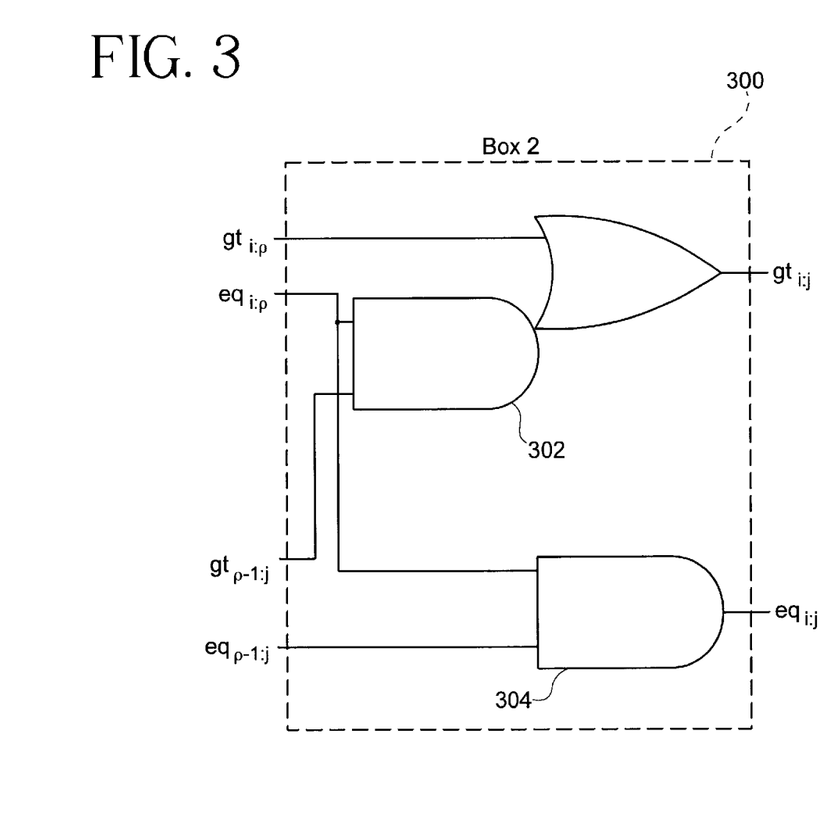
FIG. 3 is an electrical schematic diagram illustrating a preferred logical circuit for implementing equations (8) and (10), in accordance with the present invention.

FIG. 3 illustrates a preferred embodiment of the present invention which may be used to implement equations (7) and (9) above. Specifically, the logic circuit 300 (designated herein as "BOX 2") preferably generates the signals $gt_{i:j}$ and $eq_{i:j}$ from input signals $gt_{i:p}$, $eq_{i:p}$, $gt_{p-1:j}$ and $eq_{p-1:j}$, according to equations (7) and (9). Again, it should be appreciated that the circuit implementation shown in FIG. 3 and described herein is merely illustrative, and that other suitable circuit configurations are similarly contemplated for use with the present invention.

Referring now to FIG. 3, a three-input complex or compound AND-OR gate 302, or a suitable equivalent circuit or device, preferably implements the function represented by equation (7) above. As is well known by those skilled in the art, compound gates may be formed by using a combination of series and parallel switch structures (e.g., transistor elements or other suitable devices) operatively configured to synthesize a particular logical function or expression. It is to be appreciated that complex gate 302 may also be implemented as separate two-input AND and OR logic gates, wherein the output of the AND gate is operatively coupled to an input of the OR gate. A circuit employing discrete logic gates to synthesize a desired function, however, generally requires more physical space than using compound logic and is therefore not preferred.

In essence, compound gate 302 performs a logical AND operation on input signals $eq_{i:p}$ and $gt_{p-1:j}$, the result of which is logically ORed with input signal $gt_{i:p}$ in order to generate output signal $gt_{i:j}$. Similarly, in accordance with equation (9), signals $eq_{i:p}$ and $eq_{p-1:j}$ are operatively connected to first and second inputs, respectively, of logical AND gate 304, thereby generating output signal $eq_{i:j}$.

In accordance with the present invention, a similar recursive relationship can be established for $gg_{i:j}$ and $nq_{i:j}$ as set forth below. To that effect, a new definition, $nq_{i:j}$, is preferably introduced such that:

$$nq_{i:j} = nq_{i:k} \lor nq_{k-1:j} \quad (11)$$

$$nq_i = eq_i \quad (12)$$

$$gg_{i:j} = gg_{i:k} \lor (eq_{i:k} \land gg_{k-1:j}) \lor (gt_{i:k} \land nq_{k-1:j}) \quad (13)$$

where i, j and k are integers, and i>k>j such that mutually exclusive (i.e., non-overlapping) recursive intervals are established. Again, it should be appreciated that although only two intervals of recursion are shown for purposes of simplification, any number of mutually exclusive intervals can be defined. Moreover, the intervals need not be equivalent in length.

Figure 4:
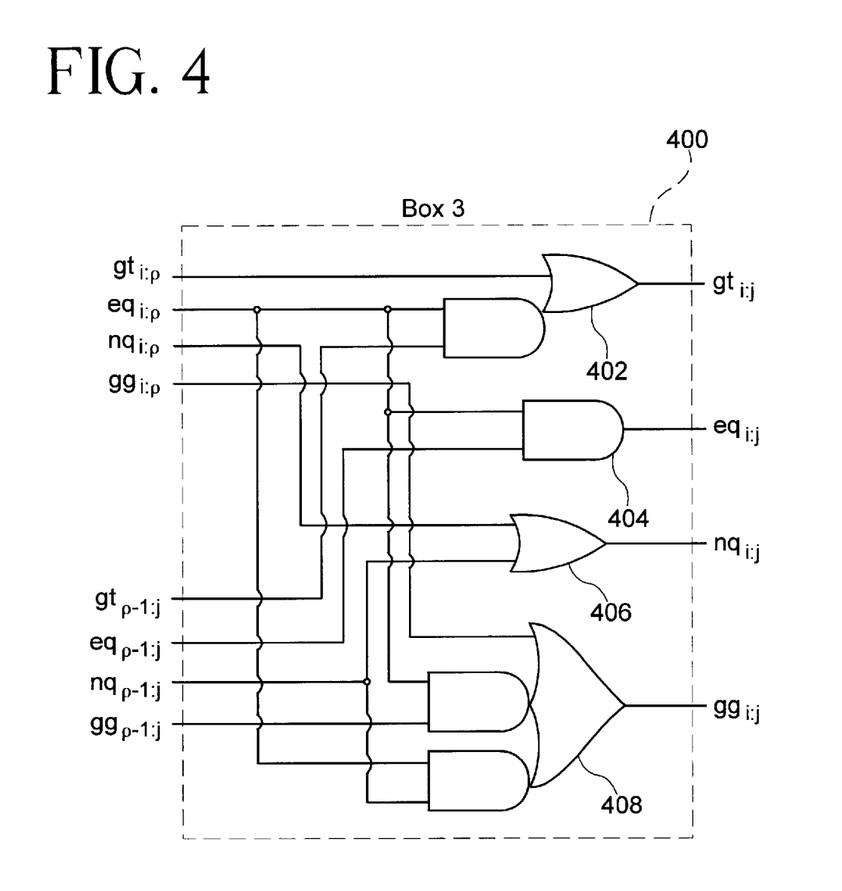
FIG. 4 is an electrical schematic diagram illustrating a preferred logical circuit for implementing equations (7), (9), (11) and (13), in accordance with the present invention.

FIG. 4, by way of example only, illustrates a preferred logic circuit implementation 400 (designated herein as "BOX 3") for generating the output signals $gt_{i:j}$, $eq_{i:j}$, $nq_{i:j}$ and $gg_{i:j}$ as defined herein by equations (7), (9), (11) and (13), respectively. As shown in FIG. 4, a logic circuit implementation for generating outputs $gt_{i:j}$ and $eq_{i:j}$ in accordance with equations (7) and (9), respectively, is preferably the same as that depicted in FIG. 3. Specifically, a three-input compound AND-OR gate 402, or suitable equivalent thereof, preferably generates output signal $gt_{i:j}$ by taking the logical AND of input signals $eq_{i:p}$ and $gt_{p-1:j}$, and logically ORing this result with the input signal $gt_{i:p}$. Similarly, logical AND gate 404 preferably generates the output signal $eq_{i:j}$ from input signals $eq_{i:p}$ and $eq_{p-1:j}$. Logical OR gate 406 preferably receives as inputs $nq_{i:j}$ and $nq_{p-1:j}$ and generates output signal $nq_{i:j}$ in accordance with equation (11) above.

With continued to FIG. 4, a five-input compound AND-OR logic gate 408, or a suitable equivalent device or circuit, is preferably employed to implement the relation expressed by equation (13) above, thereby generating output signal $gg_{i:j}$. Again, it is to be appreciated that complex gate 408 may also be implemented as separate discrete AND/OR logic gates, as appreciated by those skilled in the art. As shown in FIG. 4, inputs $eq_{i:p}$ and $gg_{p-1:j}$ are preferably logically ANDed together. Likewise, inputs $gt_{i:p}$ and $nq_{p-1:j}$ are preferably logically ANDed together. The outputs of these two intermediate AND operations are preferably logically ORed together along with the input signal $gg_{i:p}$ to generate output signal $gg_{i:j}$.

In a first level of recursion, it should be appreciated that, since no prior reduction of inputs has yet been performed, there will be no value established for the $nq_j$ and $gg_j$ inputs. Consequently, the $ng_j$ input is operatively connected to the $eq_j$ input and the $gg_j$ input is operatively connected to a logic "0" state (e.g., ground). Furthermore, in a final level of recursion, after the inputs has been reduced to one, the outputs $eq_i$ and $gg_i$ are not used, since no further level of recursion is necessary.

Figure 5:
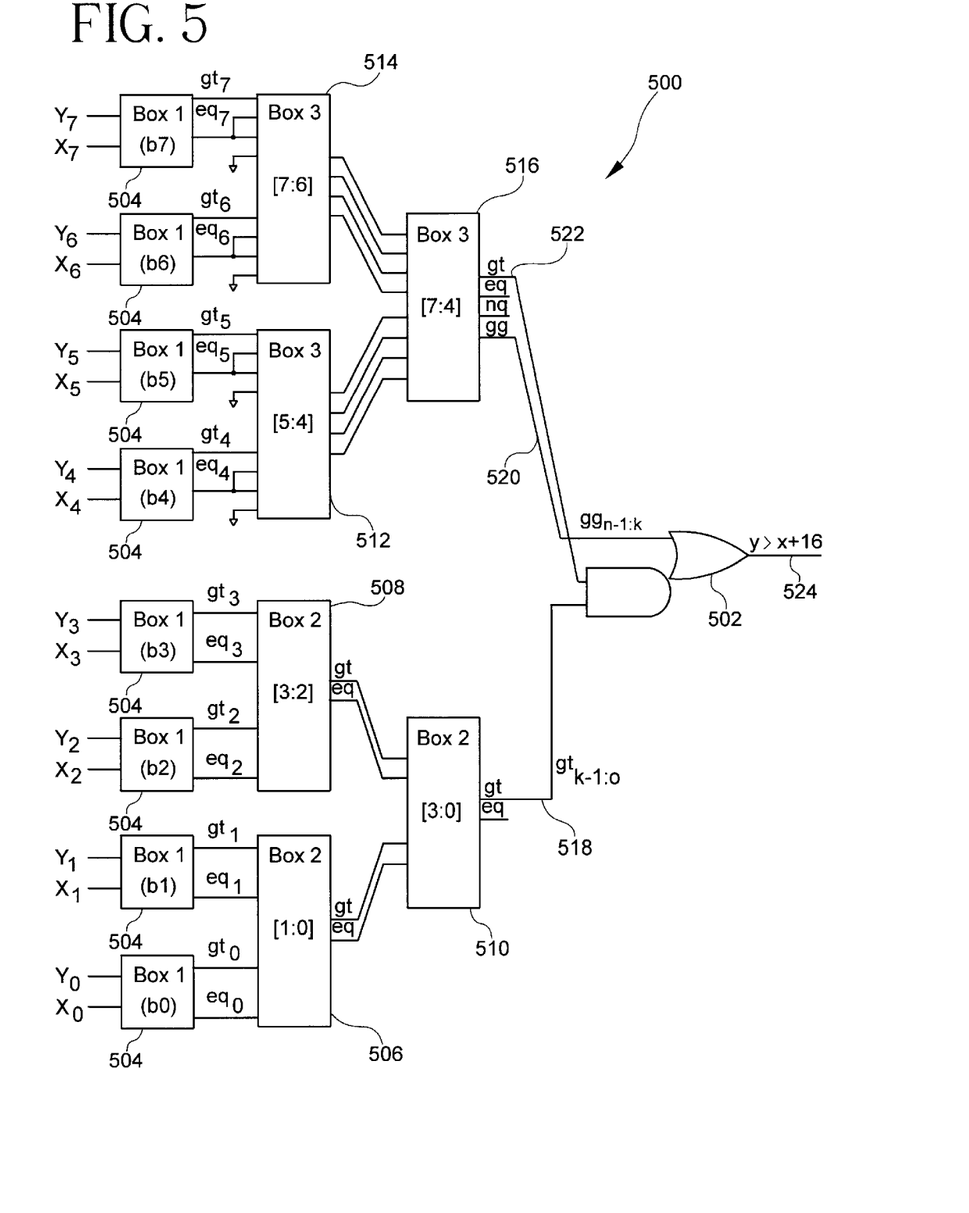
FIG. 5 is a block diagram depicting a system for comparing two binary numbers with a power-of-two threshold, formed in accordance with a preferred embodiment of the present invention.

By way of example only, FIG. 5 illustrates a block diagram depicting a preferred embodiment of a comparator system formed in accordance with the present invention. As shown in FIG. 5, the functional stages designated BOX 1, BOX 2 and BOX 3 are preferably operatively connected together, along with compound AND-OR logic gate 502, for generating a solution to the relation y>x+16, where in this illustrative example x and y are each 8-bit binary numbers (i.e., n=8) and the threshold, $2^k$, is 16 (i.e., k=4). A preferred embodiment for each of the computational circuits or blocks labeled BOX 1, BOX 2 and BOX 3 have been described in detail herein above and are shown in FIGS. 2, 3 and 4, respectively.

Referring now to FIG. 5, each bit i (where n−1≧i≧0) of the numbers x and y to be compared, is preferably coupled to corresponding inputs, $x_i$ and $y_i$, respectively, of the plurality of input logic blocks 504. As described herein above, each of the n logic blocks 504 preferably generates, as outputs, the base recursion signals $gt_i$ and $eq_i$ according to equations (8) and (10) above, respectively. The outputs $gt_i$ and $eq_i$ generated by logic blocks 504 corresponding to the k least significant bits (e.g., i=0 to 3, since k=4 in the embodiment of FIG. 5), are then recursively reduced or combined until a single output signal, $gt_{k-1:0}$, results. To accomplish this, logic blocks 506, 508 are operatively connected such that the output signals gt and eq from logic blocks 504 of two adjacent intervals (e.g., 1:0 and 3:2) are combined and propagated by logic blocks 506, 508 to the corresponding inputs of logic block 510 associated with the next recursive level. For the final level of recursion, in this case logic block 510, the output $eq_{k-1:0}$ is not used since no further propagation of signals is necessary at this point. Consequently, as a result of this recursive process, the output $gt_{k-1:0}$ is preferably generated from logic block 510.

In the preferred embodiment shown in FIG. 5, each of the recursive logic blocks (e.g., BOX 2 or BOX 3) preferably receives as inputs pairs of generate (gt) and propagate (eq) signals from consecutive or adjacent bits (e.g., bits 0, 1 and bits 2, 3) and generates a single generate and propagate signal, respectively, corresponding to the logical combination of input signals. However, the present invention similarly contemplates that essentially any number of input signals from consecutive bits may be reduced/combined by the recursive logic blocks into a single output signal by modification of the logic included therein, as understood by one skilled in the art. By combining more inputs in a recursive logic block, the number of levels or stages of recursion may be reduced.

With continued reference to the example of FIG. 5, the remaining most significant n-k bits of input numbers x and y are preferably reduced or combined in a similar manner to the recursive circuit described herein above using logic blocks 512, 514, 516. Specifically, in a first level of recursion, since outputs gg and nq have not yet been generated, each input gg of logic blocks 512 and 514 is operatively connected to a logic "0" or low state (e.g., ground or negative voltage supply) and each input nq is operatively connected to an input eq associated therewith. For subsequent stages of recursion, inputs gt, eq, nq and gg of logic block 516 are operatively connected to corresponding outputs of two adjacent intervals of the preceding level, for example intervals 5:4 and 7:6 of logic blocks 512, 514, respectively. For the final stage of recursion, namely logic block 516, outputs $eq_{n-1:k}$ and $nq_{n-1:k}$ are not used since no further propagation of signals is necessary. Therefore, outputs $gt_{n-1:k}$ and $gg_{n-1:k}$ are generated from the recursion ending with logic block 516.

The output signal $gt_{k-1:0}$, resulting from the recursive circuit configuration including logic blocks 506, 508, 510, and output signal $gt_{n-1:k}$, resulting from the recursive circuit configuration including logic blocks 512, 514, 516, are preferably combined in a logical AND operation, the result of which is preferably ORed with the output signal $gg_{n-1:k}$ to generate the desired output 524 representing a solution to the relation y>x+16. It is to be appreciated that the AND-OR operation described herein is preferably implemented by a compound gate 502 as depicted in FIG. 5, although any suitable equivalent device or circuit may be similarly employed.

The equations defined herein above are essentially all the equations necessary to compute the desired relation $y>x+2^k$ with a logic circuit whose depth is logarithmic with the size of the input numbers. It should be appreciated that, in accordance with the present invention, the relation y>x can also be computed with the addition of just one extra logic gate, with the equation $$y>x=gt_{n-1:k} \vee (eq_{n-1:k} \wedge gt_{k-1:0}). \quad (14)$$

In accordance with the above equation, the output relation y>x is preferably generated with the addition of a compound AND-OR gate (not shown). In this instance, output $gt_{k-1:0}$ from logic block 510 may be logically ANDed with output $eq_{n-1:k}$ from logic block 516, the result of which is logically ORed with output $gt_{n-1:k}$ from logic block 516.

It is to be understood that while the equations set forth herein have been described in conjunction with the preferred circuit implementations depicted in FIGS. 2 through 5, a solution to these equations may also be generated, for example, by a computer system (not shown), or an equivalent thereof, running applications software capable of similarly performing the stated functions, in accordance with the present invention.

The computer system may be implemented in accordance with a processor, a memory and input/output (I/O) devices. It is to be appreciated that the term "processor" as used herein is intended to include any processing device (e.g., digital signal processor, microcontroller), for example, one that includes a central processing unit (CPU) and/or processing circuitry. The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc. In addition, the term "I/O devices" as used herein is intended to include, for instance, one or more input devices (e.g., mouse, keyboard, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in whole or in part (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of comparing two n-bit binary numbers with a power of two threshold ($2^k$), the method comprising the steps of:

generating n propagate (eq) and n generate (gt) signals, each of the n propagate and generate signals corresponding to a bit of the two n-bit binary numbers;

comparing a first set of propagate and generate signals and generating a first output signal, the first output signal representing a comparison of k least significant bits of the two binary numbers;

comparing a second set of propagate and generate signals and generating second and third output signals, the second output signal representing a comparison of n-k most significant bits of the two binary input numbers, the third output signal representing a much_greater_ than comparison of the n-k most significant bits of the two binary numbers; and combining the first, second and third output signals to generate an output signal $y>x+2^k$ representing a comparison of the two binary numbers with the power-of-two threshold;

wherein the comparison of the two binary numbers with the power-of-two threshold does not use a pre-addition operation on the binary numbers and the power-of-two threshold and does not use an exclusive-OR logic operation.

2. The method of claim 1, wherein the step of comparing the first set of propagate and generate signals further comprises the step of reducing the first set of signals by repeatedly combining a predetermined number of corresponding propagate signals and predetermined number of corresponding generate signals from adjacent bits in a previous recursion level into a new propagate signal and generate signal, respectively, associated with the combined adjacent bits, the reducing being performed until a single generate signal, $gt_{k-1:0}$, is generated for an interval including the k least significant bits of the two binary numbers.

3. The method of claim 1, wherein the step of comparing the second set of propagate and generate signals further comprises the step of reducing the second set of signals by repeatedly combining a predetermined number of corresponding propagate signals and predetermined number of corresponding generate signals from adjacent bits in a previous recursion level into a new propagate signal and generate signal, respectively, associated with the combined adjacent bits, the reducing being performed until a single generate signal, $gt_{n-1:k}$, is generated for an interval including the n-k most significant bits of the two binary numbers.

4. The method of claim 3, wherein the step of comparing the second set of propagate and generate signals further comprises the steps of:

generating much_greater_than (gg) and equal to (nq) output signals for each of the recursion levels associated with the n-k most significant bits of the two n-bit binary numbers, the signal gg being initially set to zero and the signal nq being initially set to an initial value of the propagate signal corresponding to a same bit; and reducing a set of gg signals and nq signals by repeatedly combining a predetermined number of corresponding gg signals and nq signals from adjacent bits in a previous recursion level into a new much_greater_ than signal and equal_to signal, respectively, associated with the combined adjacent bits, the reducing being performed until a single much_greater_than signal, $gg_{n-1:k}$, is generated for the interval including the n-k most significant bits of the two binary numbers.

5. The method of claim 1, wherein the step of combining the first, second and third output signals to generate the output signal $y>x+2^k$ representing a comparison of the two n-bit binary numbers with the power-of-two threshold, $2^k$, further comprises the step of generating a generate output signal, $gt_{n-1:0}$, the generate output signal $gt_{n-1:0}$ being a logical AND of the generate signals $gt_{k-1:0}$ and $gt_{n-1:k}$ corresponding to the k least significant bits and the n-k most significant bits, respectively, of the two binary numbers, the output signal $y>x+2^k$ being a logical OR of the generate output signal, $gt_{n-1:0}$, and the much_greater_than signal, $gg_{n-1:k}$.

6. The method of claim 1, wherein the step of comparing the second set of propagate and generate signals further comprises the step of generating a fourth output signal, the fourth output signal being a propagate signal comparison of the n-k most significant bits of the two binary numbers, the method further comprising the step of combining the first, second and fourth output signals to generate an output signal, $y>x$, representing a comparison of the two binary numbers.

7. The method of claim 6, wherein the step of comparing the second set of propagate and generate signals further comprises the step of reducing the second set of signals by repeatedly combining a predetermined number of corresponding propagate signals and predetermined number of corresponding generate signals from adjacent bits in a previous recursion level into a new propagate signal and generate signal, respectively, associated with the combined adjacent bits, the reducing being performed until a single propagate signal, $eq_{n-1:k}$, and a single generate signal, $gt_{n-1:k}$, is generated for an interval including the n-k most significant bits of the two binary numbers.

8. The method of claim 6, wherein the step of comparing the first set of propagate and generate signals further comprises the step of reducing the first set of signals by repeatedly combining a predetermined number of corresponding propagate signals and predetermined number of corresponding generate signals from adjacent bits in a previous recursion level into a new propagate signal and generate signal, respectively, associated with the combined adjacent bits, the reducing being performed until a single generate signal, $gt_{k-1:0}$, is generated for an interval including the k least significant bits of the two binary numbers.

9. Apparatus for comparing two n-bit binary numbers with a power of two threshold ($2^k$) comprising:

a plurality of generate-propagate circuits, each generate-propagate circuit generating a propagate output signal, eq, and a generate output signal, gt, corresponding to a bit of the two n-bit binary numbers;

a first comparator operatively connected to one or more generate-propagate circuits corresponding to k least significant bits of the two binary numbers, the first comparator receiving as inputs the generate and propagate signals and generating a first output, the first output being a combined generate signal, $gt_{k-1:0}$, corresponding to the k least significant bits of the two binary numbers;

a second comparator operatively connected to one or more generate-propagate circuits corresponding to n-k most significant bits of the two binary numbers, the second comparator receiving as inputs the generate and propagate signals and generating second and third outputs, the second output being a combined generate signal, $gt_{n-1:k}$, corresponding to the n-k most significant bits of the two binary numbers and the third output being a combined much greater than signal, $gg_{n-1:k}$, corresponding to the n-k most significant bits of the two binary numbers; and a complex logic circuit operatively connected to the first and second comparators, the complex logic circuit generating a comparison output $y>x+2^k$, the comparison output being a logical OR of the third output and an intermediate signal that is a logical AND of the first and second outputs.

10. The apparatus of claim 9, wherein the generate-propagate circuit comprises:

an AND logic gate operatively connected to a bit of the two binary numbers and generating the corresponding generate output signal; and an OR logic gate operatively connected to a bit of the two binary numbers and generating the corresponding propagate output signal.

11. The apparatus of claim 9, wherein the first comparator comprises one or more recursive generate-propagate circuits operatively connected such that at least one recursion level is formed, each recursive generate-propagate circuit combining a predetermined number of generate and propagate signals from adjacent bits in a previous recursion level and generating a single recursive generate signal, $gt_{i:j}$, and a single recursive propagate signal, $eq_{i:j}$, respectively, associated with the combined adjacent bits, whereby the first comparator combines the generate and propagate signals corresponding to the k least significant bits of the binary numbers to generate the first output $gt_{k-1:0}$.

12. The apparatus of claim 11, wherein the recursive generate-propagate circuit comprises:

an AND logic gate operatively connected to the propagate signals corresponding to adjacent bits in the previous recursion level and generating the recursive propagate signal; and a complex logic gate operatively connected to the generate signals corresponding to adjacent bits in the previous recursion level and to the propagate signal corresponding to a most significant bit in the previous recursion level, the complex logic gate generating the recursive generate signal.

13. The apparatus of claim 9, wherein the second comparator comprises one or more recursive circuits operatively connected such that at least one recursion level is formed, each recursive circuit combining a predetermined number of generate and propagate signals from adjacent bits in a previous recursion level and generating a single recursive generate signal, $gt_{i:j}$, and a single recursive much_greater_than signal, $gg_{i:j}$, associated with the combined adjacent bits, whereby the first comparator combines the generate and propagate signals corresponding to the n-k most significant bits of the binary numbers to generate the second and third outputs, $gt_{n-1:k}$ and $gg_{n-1:k}$, respectively.

14. Apparatus for comparing two n-bit binary numbers with a power of two threshold ($2^k$) comprising:

at least one processor operative to: (i) generate n propagate (eq) and n generate (gt) signals, each of the n propagate and generate signals corresponding to a bit of the two n-bit binary numbers; (ii) compare a first set of propagate and generate signals and generating a first output signal, the first output signal representing a comparison of k least significant bits of the two binary numbers; (iii) compare a second set of propagate and generate signals and generating second and third output signals, the second output signal representing a comparison of n-k most significant bits of the two binary input numbers, the third output signal representing a much_greater_than comparison of the n-k most significant bits of the two binary numbers; and (iv) combine the first, second and third output signals to generate an output signal $y>x+2^k$ representing a comparison of the two binary numbers with the power-of-two threshold.

15. The apparatus of claim 14, wherein the processor does not perform a pre-addition operation on the binary numbers and the power-of-two threshold and does not use an exclusive-OR logic operation to compare the two binary numbers with a power of two threshold.

* * * * *

UNITED STATES PATENT AND TRADEMARK OFFICE
CERTIFICATE OF CORRECTION

PATENT NO. : 6,795,842 B2
DATED : September 21, 2004
INVENTOR(S) : Jose A. Tierno

It is certified that error appears in the above-identified patent and that said Letters Patent is hereby corrected as shown below:

Column 3,
Line 62, equation 8, delete ">" and insert -- ¬ --
Line 66, equation 10, delete ">" and insert -- ¬ --

Column 4,
Line 1, delete ">" and insert -- ¬ --

Signed and Sealed this

Eleventh Day of January, 2005

JON W. DUDAS
*Director of the United States Patent and Trademark Office*